Patented Oct. 11, 1932

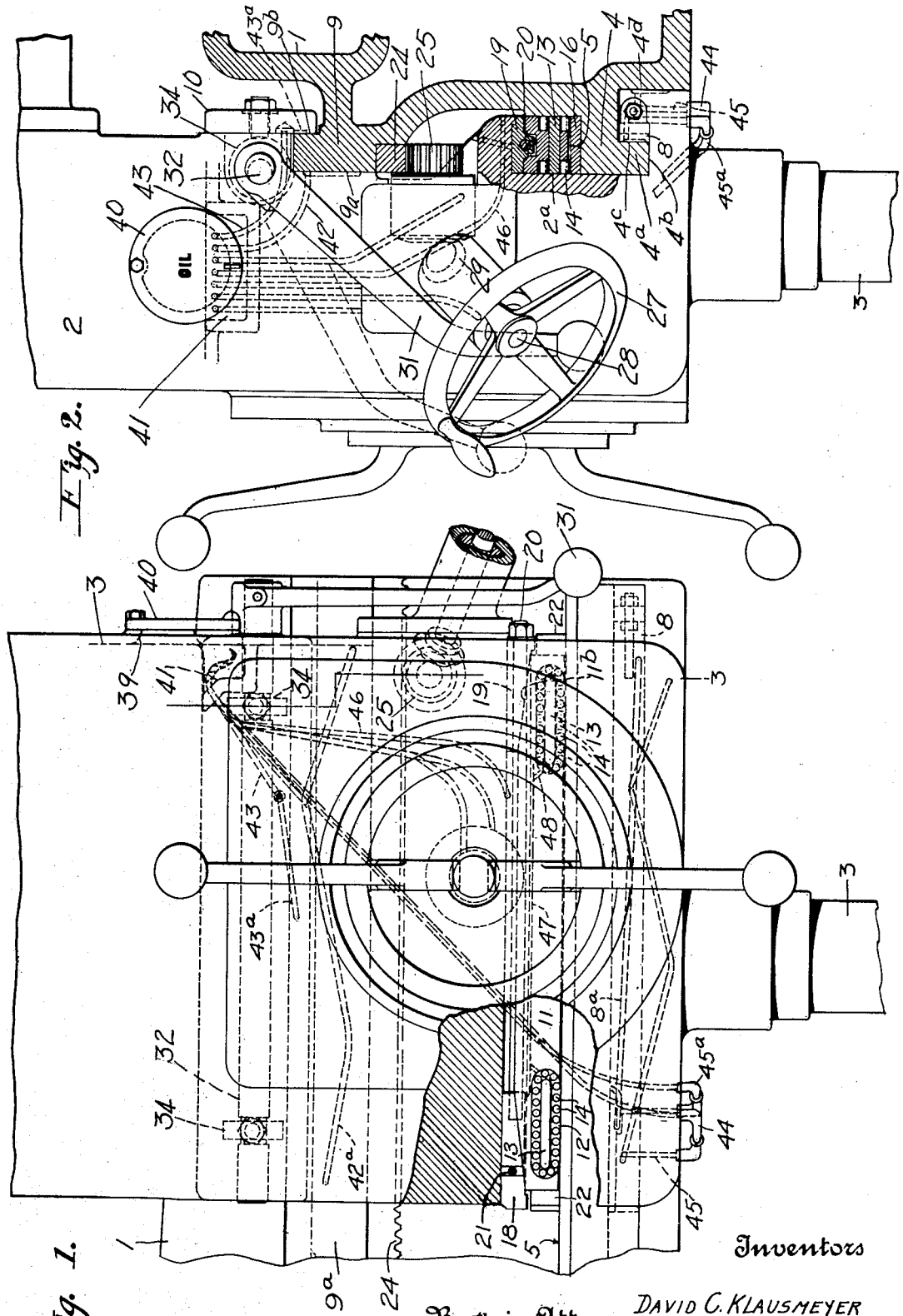

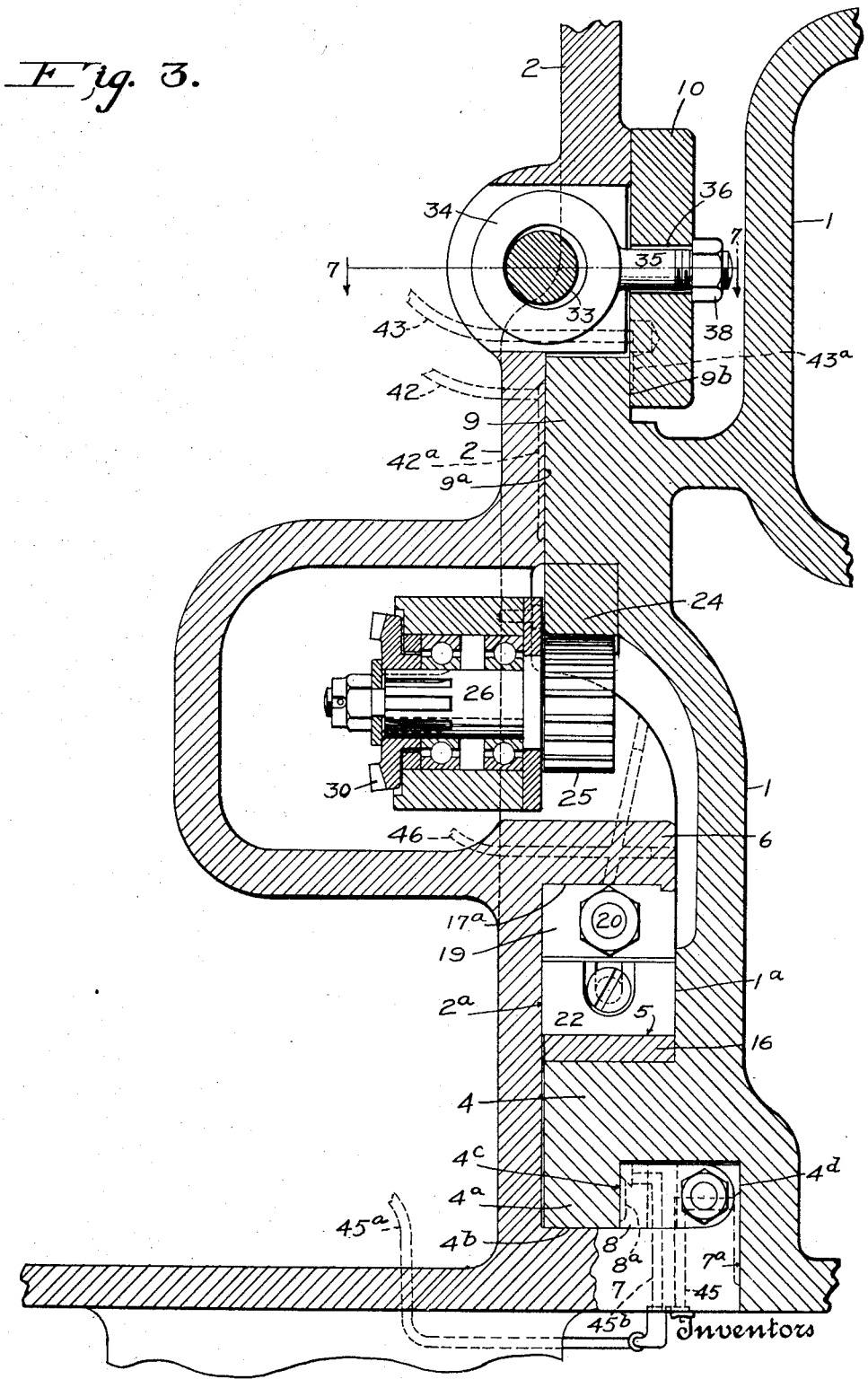

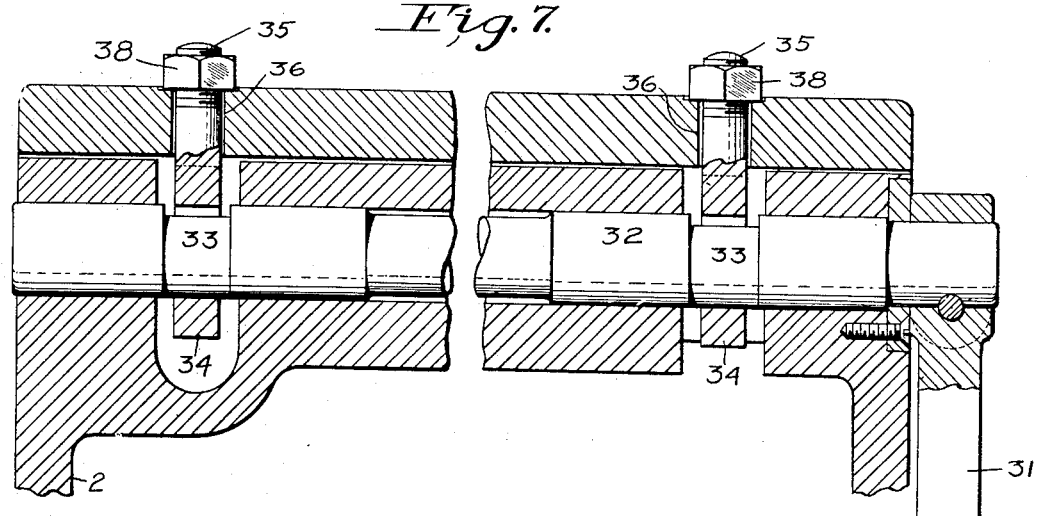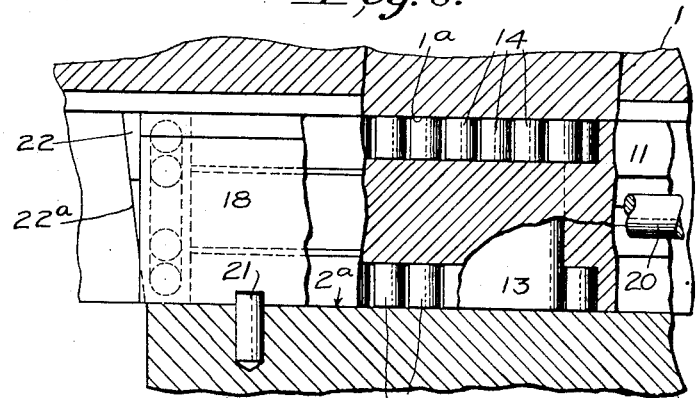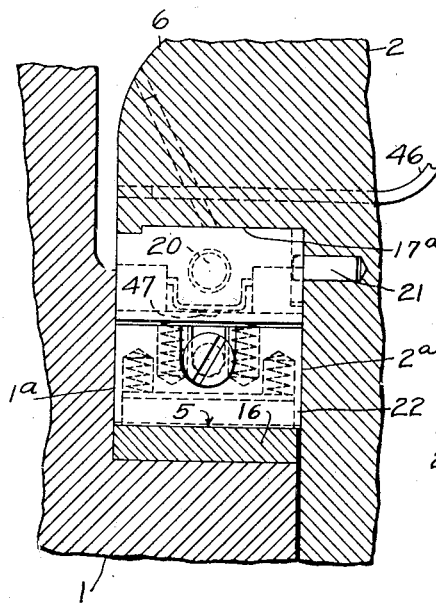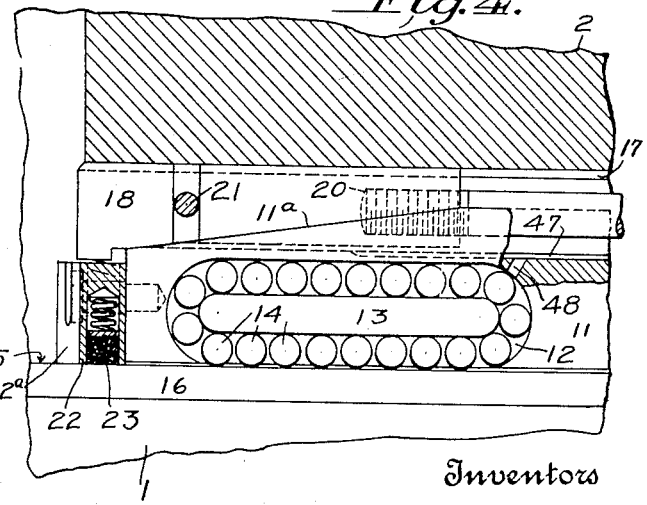

1,881,675

UNITED STATES PATENT OFFICE

DAVID C. KLAUSMEYER, DECEASED, LATE OF HYDE PARK, CINCINNATI, OHIO, BY H HENRY SUNDERMANN, EXECUTOR, OF CINCINNATI, OHIO, AND AUGUSTUS M. SOSA, OF CINCINNATI, OHIO, ASSIGNORS TO THE CINCINNATI BICKFORD TOOL COMPANY, OF CINCINNATI, OHIO, A CORPORATION OF OHIO

HEAD MOUNT WITH ROLLER BEARING GIB

Application filed January 11, 1930. Serial No. 420,255.

Certain types of machines include manually movable elements, which during the use of the machines, are required to receive relative translation. These elements frequently are of great weight and, due to friction, relative movement therebetween may be effected only with substantial effort on the part of the operator.

A radial drill is a good example of machines in which this difficulty has been experienced; the drill head, translatably mounted on the radial arm, being the heavy element required to be moved. Difficulty has been experienced in the operation of radial drills also because of the fact that under certain conditions the drill head may tend to tip transversely of its supporting arm thereby causing looseness between certain complemental bearing surfaces which are intended to remain in contact and causing binding action between still other complemental bearing surfaces.

Heretofore radial drills have been provided with manually actuated means for translating the drill-head on the arm and, to enable the operator easily to move the drill head, this means has usually included an irreversible speed reduction gearing such, for example, as a worm and worm-wheel. While this means facilitated the movement of the drill-head it likewise proportionately reduced the rate at which the head could be moved.

This invention seeks to provide an improved mounting whereby one member may be rigidly supported on another and moved thereon with ease and with great rapidity.

In its more limited aspects, this invention seeks to provide an improved support for radial drill heads in which the friction between the drill head and the arm will be materially less than in prior constructions and in which the tendency of the head to bind on the guideways provided by the arm will be materially lessened, as will the tendency of the head to tip laterally of its supporting arm.

Another object of this invention is to provide an anti-friction support for drill-heads which will so facilitate translation of the head that a reversible manually actuated transmission, devoid of speed reduction gearing, may be utilized to effect translation of the drill-head on the arm. A support and transmission of this nature is particularly desirable in that it permits rapid translation of the head by other means (such for example as by the operator pushing on the head) without disconnecting the manual transmission. The manual drive, being reversible, permits motion to flow backwardly therethrough when the drill head is moved by said other means.

Still another object of this invention is to provide an improved anti-friction mount for drill heads and to combine therewith continuously acting means for lubricating the guide surfaces and anti-friction devices forming a part of the anti-friction mount.

While this invention is, for convenience, shown and described in connection with a radial drill it is to be understood that the invention is in nowise limited to such use and that it may be employed to advantage in many other constructions involving relatively movable members.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a front view partly in section of a portion of a radial drill arm and a portion of a drill-head mounted thereon, embodying this invention. Fig. 2 is a right end view of Fig. 1, the arm and portions of the drill head being shown in section. Fig. 3 is a section substantially on the line 3—3 of Fig. 1. Fig. 4 is an enlarged detail view of one end of an improved gib provided by this invention. Fig. 5 is a left end view partly in section of Fig. 4. Fig. 6 is a plan view, partly in section of Fig. 4. Fig. 7 is a sectional view on the line 7—7 of Fig. 3 showing an improved clamping mechanism.

Referring more specifically to the drawings, the invention is disclosed as embodied in a radial drill comprising a horizontally disposed arm 1 on which is translatably mounted a drill head 2, carrying the usual drill spindle 3. The arm is provided, adjacent its lower edge, with a lateral rib or rail 4 which extends lengthwise of the arm and affords at its upper side a relatively wide horizontally disposed seat 5 which receives the weight of the drill head. The lower portion of the rib 4 is preferably rectangular or square as shown at 4ª and affords a bottom bearing surface 4ᵇ adapted to receive the upward thrust of the drill head, when the drill is bearing against the work and a rear bearing surface 4ᶜ adapted to prevent outward movement of the head. The drill head is provided with a portion 6 which overlies the seat 5 and an L-shaped portion 7 which underlies and engages the surface 4ᵇ, extends upwardly behind the portion 4ª and engages a vertical bearing surface 4ᵈ also provided by the arm. An adjustable gib 8, intervening between the surface 4ᶜ and the upwardly projecting part of the portion 7, serves to force the rear face 7ª of said portion into contact with the vertical bearing surface 4ᵈ of the arm. Above the rail 4, and also extending lengthwise of the arm 1, is a second rail 9 having a forward bearing face 9ª adapted to be engaged by the head 1 and a rear face 9ᵇ adapted to be engaged by a clamp bar 10 forming a part of a clamp mechanism later to be described. The above described construction affords an extremely rigid support for the drill-head and one which prevents tipping and canting of the drill head relative to the arm.

To facilitate translation of the drill-head along the arm this invention provides a novel anti-friction connection between the drill-head supporting seat 5 and the drill head. This anti-friction connection is preferably combined with and forms a part of an adjustable gib 11 carried by the drill-head beneath the portion 6 thereof and adapted to take up play between the head and arm due to wear on the surface 4ᵇ and in the devices forming the anti-friction connection. The gib 11 may be of relatively low grade metal and is preferably formed, adjacent each end and at each side thereof with a relatively shallow channel 12 extending inwardly from the lower edge of the gib and having rounded ends and straight sides, the latter being parallel with the lower edge of the gib. Projecting through the gib and centrally into the channels 12 at opposite sides of each end of the gib are relatively high grade hardened metal plates 13 the outer surfaces of which form, with the inner surfaces of said channels, continuous grooves each of which is filled with a series of roller bearings 14. Those roller bearings between the lower face of the plates 13 and the drill-head supporting seat 15 constitute a plurality of series of anti-friction devices which solely support the weight of the head and enable it very easily to be translated on the arm. During such translation the rollers 14 circulate in the continuous grooves afforded by the channels 12 and the seat 5.

To further facilitate shifting of the head and to prevent wear in the parts, the drill head bearing surface or seat 5 is preferably provided by a strip 16 of hardened metal secured upon the rib 4 of the arm. The metal in the strip 16 is of materially higher grade than that of the arm 1 which supports it. The rollers 14 are relatively short, being preferably not much greater in length than their diameter. The outer two series of rollers are held against moving out of their grooves by the wall 2ª of the drill head and the rear two series are held in their respective grooves by the portion 1ª of the arm.

It is to be noted that the four small series of relatively short roller bearings support the weight of the drill head at points widely spaced in the direction of the length of the arm and also at opposite edges of a relatively wide drill head supporting seat. This provision of a plurality of series of roller bearings affords decided advantages in that it distributes the weight of the head, eliminates the tendency of the rollers to crowd and thereby renders the head more easily shifted. Furthermore, by having the roller bearings relatively short, there is no tendency for them to cant in their respective grooves as they would were they materially longer.

The gib 11 is mounted in a channel 17 formed in the drill-head and this channel is parallel with the seat 5 as distinguished from the conventional tapered channel which is expensive to manufacture. To effect adjustment of the gib toward the seat, wedges 18 and 19 are inserted in the channel between tapered surfaces 11ª and 11ᵇ of the gib and the remote wall 17ª of the channel 17. A bolt 20, passing loosely through the wedge block 19 and threaded into the wedge block 18 serves to draw the wedges together thereby to force the gib toward the seat 5. A pin-and-slot connection 21 between the wedge 18 and the head 2 prevents axial movement of the gib but permits lateral movement thereof.

To enable an operator rapidly to translate the drill head on the arm and also to effect a very accurate setting thereof to position the drill with respect to the work, a rack 24 extends lengthwise and a gear 25, meshing with said rack is fixed to one end of a shaft 26 journaled in the drill-head. A hand-wheel 27, fixed to a second shaft 28 also journaled in the drill-head, is connected to the shaft 26 by means of bevel gears 29 and 30. The hand wheel is located and positioned in a place where it is convenient of rotation by the operator. It is to be noted that the connection from the hand wheel 27 to the gear 25 is reversible whereby power may flow either way therethrough. It is also to be noted that the connection is devoid of speed reduction gearing. This is possible because of the ease with which the head may be moved due to the improved mounting.

After the drill-head has been translated on the arm to position the drill point with respect to the work, it is essential that it be rigidly secured to the arm to prevent its shifting thereon during the drilling operation. This is effected by an improved clamp mechanism comprising an actuating lever 31 mounted in close proximity to the hand-wheel 27 and fixed to a shaft 32 journaled in the drill-head lengthwise of the arm 1. Intermediate its end the shaft 32 is formed with eccentrics 33 engaged by straps 34 provided by draw bolts 35 which pass through apertures 36 in the clamp bar 10 and have nuts 38 secured thereto. Thus it will be seen that by a slight movement of the lever 31 the shaft 32 may be rotated sufficiently to cause the rail 9 to be gripped between the clamp bar 10 and the drill head.

Another feature of this invention resides in the provision of means for continuously lubricating the surfaces $4^c$, $4^d$, $9^a$, $9^b$, the seat 5 and the anti-friction rollers 14. To that end, there is formed in the drill-head 2, adjacent an opening 39, normally closed by a cover plate 40, a reservoir 41 which holds a supply of lubricant placed therein through the opening 39.

Lubricant conduits 42 and 43 extend from the reservoir to oil grooves $42^a$ and $43^a$ formed respectively in the drill head, adjacent the bearing face $9^a$ and in the clamp bar 10 serve to lubricate the faces $9^a$ and $9^b$ respectively. A similar conduit 44 extends from the reservoir to a bore 45 connecting oil channels formed in the surface $7^a$. Conduit $45^a$ conveys fluid from the reservoir to ports $45^b$ and channels $8^a$ formed in the gib 8. Still another conduit 46 connects the reservoir with an oil grove 47 formed in the gib 11, lengthwise thereof. Ducts 48, extending from the groove 47 to the channels 12 which house the roller bearings 14 serve to transmit lubricant to the rollers and to the head supporting seat 5. Other conduits may extend from the reservoir to various other bearings in the drill-head.

Inasmuch as the roller bearings and the surfaces $4^c$, $4^d$, 5, $9^a$ and $9^b$ require very little lubricant, and an overabundance is highly objectionable, the conduits are preferably filled with a suitable wicking whereby the lubricant is conducted to the surfaces continuously but in small quantities by capillary action.

At each end the gib 11 is provided with a scraper element 22 having an inclined face $22^a$ adapted to scrape upon the seat 5 and maintain it free of dirt. A spring pressed wiper 23 is carried by each scraper element and serves to spread a thin film of oil on the seat.

Without further analysis the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. In a radial drill, the combination of an arm affording a drill-head supporting surface extending lengthwise of said arm; a drill-head fitted to and translatably mounted on said arm; an adjustable gib intervening between said drill-head supporting surface and said drill-head; two individual series of roller bearings carried by said gib adjacent each of its ends, and engaging said drill-head supporting surface, the two series of roller bearings adjacent either end of said gib being arranged at opposite sides of the center line of said gib, said four series roller bearings comprising the sole means for transmitting to said arm the weight of said drill-head.

2. In a machine tool, the combination of a support affording first and second guideways; a member translatably mounted on said support and cooperating with said guideways to prevent relative lateral movement between said support and said translatable member; a gib intermediate said translatable member and one of said guideways, said gib comprising a body member provided, in its sides adjacent each of its ends, with a relatively shallow groove one wall of which is cut away adjacent one of said guideways; a series of relatively short roller bearings arranged in each of said grooves the length of said roller bearings being approximately the diameter thereof said roller bearings projecting from said grooves where the walls thereof are cut away said roller bearings comprising anti-friction connections between said gib and one of said guideways; and means to adjust said gib toward its cooperating guideway.

3. In a radial drill, the combination of an arm; guiding surfaces extending lengthwise of said arm; a drill-head fitted to said guiding surfaces and translatable along said arm; a strip of metal, of higher grade than the metal of said arm, secured lengthwise of said arm and affording at its upper face a bearing surface adapted to support the weight of said head; an adjustable gib intervening between said strip and said drill-head, said gib being provided at either side adjacent its opposite ends with a channel; plates of metal of higher grade than said gib projecting through said gib and into said channels, substantially centrally thereof, the outer walls of said plates coöperating with the inner walls of said channels and the upper face of said strip to form raceways; roller bearings in each of said raceways, said roller bearings affording the sole means of transmitting to said arm the weight of said drill-head.

4. In a machine tool, the combination of a support affording a bearing surface; a member translatably mounted on said support and provided with a non-tapered channel; an adjustable gib mounted in said channel and intervening between the bearing surface of said support and said member; a plurality of longitudinally and laterally spaced sets of anti-friction bearings carried by said gib and engaging said bearing surface, said anti-friction bearings affording the sole means for transmitting to said support the pressure exerted by said translatable member; and means in said channel for adjusting said gib laterally toward said bearing surface.

5. The combination set forth in claim 4 in which the means for adjusting the gib laterally comprises a wedge inserted between each end of the gib and a wall of said channel and in which a bolt passing through one of said wedges and threaded into the other wedge serves to move one of said wedges axially relative to the other thereby to cause them to shift said gib laterally.

6. The combination set forth in claim 4 in which the bottom wall of the channel in the translatable member is substantially parallel with the bearing surface of the support; in which the end portions of the gib are tapered at the side remote from the bearing surface afforded by the support, in which wedge members are inserted between said tapered portions and the bottom wall of said channel; in which one of said wedges is held against axial movement by a pin and slot connection with said translatable member; and in which a bolt connecting said wedges serves to effect relative axial adjustment between said wedges thereby to effect lateral adjustment of said gib.

7. In a radial drill, the combination of an arm affording two vertically spaced ribs, the upper comprising a clamp rail and the lower comprising a drill-head supporting and guiding rail, the lower rib affording at its upper face a relatively wide horizontally disposed drill-head seat and at its lower portion a substantially rectangular drill-head guide; a drill head having one portion overlying said seat, another portion extending below and upwardly behind the vertical wall of said rectangular portion to prevent upward and outward movement of the drill head and a portion adapted to clamp upon said upper rib to prevent translation of said drill head on said arm; a gib interposed between said seat and that portion of the drill head overlying said seat to transmit to the latter the weight of said drill head; a plurality of longitudinally and laterally spaced sets of roller bearings fitted into raceways provided by said gib, two of said sets of roller bearings engaging said horizontal seat adjacent its outer edge and the other two sets engaging said seat adjacent its inner edge.

In witness whereof, we have hereunto subscribed our names.

H. HENRY SUNDERMANN,
*Executor of the Last Will and Testament of David C. Klausmeyer, Deceased.*
AUGUSTUS M. SOSA.